(12) United States Patent
Hammerschmidt et al.

(10) Patent No.: US 9,735,992 B2
(45) Date of Patent: Aug. 15, 2017

(54) RECEIVER AND METHOD FOR RECEIVING A SIGNAL

(71) Applicant: Infineon Technologies AG, Neubiberg (DE)

(72) Inventors: Dirk Hammerschmidt, Villach (AT); Wolfgang Scherr, Villach (AT)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 15/274,730

(22) Filed: Sep. 23, 2016

(65) Prior Publication Data

US 2017/0111195 A1    Apr. 20, 2017

Related U.S. Application Data

(63) Continuation-in-part of application No. 14/882,691, filed on Oct. 14, 2015, now Pat. No. 9,467,185.

(30) Foreign Application Priority Data

Oct. 24, 2014 (DE) .................. 10 2014 115 493

(51) Int. Cl.
 *H04B 14/04* (2006.01)
 *H04L 27/156* (2006.01)
 *H04L 7/00* (2006.01)

(52) U.S. Cl.
 CPC ........ *H04L 27/1563* (2013.01); *H04L 7/0087* (2013.01)

(58) Field of Classification Search
 CPC ........ H03M 5/08; H03M 1/822; H03M 1/504; H03M 3/38; H03M 7/302; H03M 1/0648; H03M 2201/3157; H03M 2201/32; H03M 2201/33; H03M 3/432; H04L 25/4902; H04L 25/4927
 USPC .......... 341/155, 152, 53, 200; 375/238, 342, 375/243, 340; 332/109, 209; 370/212; 329/312
 See application file for complete search history.

(56) References Cited

U.S. PATENT DOCUMENTS

| | | | |
|---|---|---|---|
| 9,467,185 B2 | 10/2016 | Hammerschmidt et al. | |
| 2007/0268161 A1* | 11/2007 | Hernandez | H03M 1/504 341/50 |
| 2008/0192873 A1 | 8/2008 | Tamura et al. | |

* cited by examiner

*Primary Examiner* — Rahel Guarino
(74) *Attorney, Agent, or Firm* — Harrity & Harrity, LLP

(57) ABSTRACT

A receiver may receive a pulse width encoded signal. The receiver may determine a position of a transition of a pulse of the pulse width encoded signal by oversampling the pulse width encoded signal with respect to a quantization function. The receiver may determine that the position of the transition deviates from an expected position according to the quantization function by more than a predetermined range. The receiver may generate a signal, indicating an unexpected event, based on determining that the position of the transition deviates from the expected position. The receiver may detect an error in a message corresponding to the pulse width encoded signal based on a check value identified from the pulse width encoded signal. The receiver may adjust, based on the signal indicating the unexpected event, a value, corresponding to the position of the transition, to cause the error in the message to be corrected.

20 Claims, 6 Drawing Sheets

RECEIVER AND METHOD FOR RECEIVING A SIGNAL

RELATED APPLICATION

This application is a Continuation-In-Part (CIP) of U.S. patent application Ser. No. 14/882,691 (now U.S. Pat. No. 9,467,185), filed on Oct. 14, 2015, which claims priority under 35 U.S.C. §119 to German Patent Application No. 102014115493.2, filed on Oct. 24, 2014, the contents of which are incorporated by reference herein in their entirety.

FIELD

Embodiments relate to a receiver and a method for receiving a signal, which may be used, for instance, to receive a datum encoded in a pulse width encoded signal.

BACKGROUND

In many fields of technology data are to be transferred in a system from one location to another. Examples come from all kinds of applications and tasks to be performed, for instance, including collecting sensor-related data from a sensor arranged at a different location than its corresponding control or processing unit responsible, for instance, for collecting and pre-processing the data. Other examples include, for instance, writing and/or reading data from a memory located at a different location, providing control signals to an actuator, reading data from or providing data to a user interface to name just a few examples.

While in many fields of technology and applications, data may be transmitted using highly sophisticated transmission schemes, a tendency exists to simplify the infrastructure used for transmitting data. In some of the fields and applications, comparably rough operating conditions may be present causing, for instance, disturbances in the transmissions. However, also under these more difficult operational conditions, the availability of the data may be important or even crucial for operating the corresponding system.

While highly sophisticated transmission schemes and their infrastructures may be capable of operating even under very difficult operation conditions, the tendency to simplify the infrastructure necessary to transmit the data is also present in these environments. This may limit the options available to a designer to reduce the influence of disturbances onto the signal transmission. Examples of options, which may not be available to a system designer, include additional shielding measures, increasing the available computational power to allow more elaborate error correcting codes to be used, increasing the signal energy to boost the signal-to-noise ratio and similar options.

Nevertheless, a robust operation of such a system, a comparably simply implementation and a robust transmission of data may yet be desirable. At the same time, a desire exists to increase the available bandwidth or—in other words—the available data throughput.

In the field of high volume architectures and/or low cost implementations, finding a solution to this challenge may be even more relevant than in other fields of technology. For instance, in motorized vehicles communication links via which different components communicate with one another and transmit data may be subjected to a large variety of tough operating conditions and a large number of distortions of different types. Distortions may, for instance, come from electric impulses used to operate systems of a vehicle, which in turn may capacitively or inductively couple into the transmission link. The situation may further be aggravated by environmental conditions which may at least partially lead to a signal degradation or even introduce additional types of distortions. Among the environmental conditions may, for instance, be large variations of the ambient temperature, the influence of moisture and vibrations to name just a few sources of additional distortions.

Although in the case of electrical systems and electrical signal transmission schemes these influences and distortions may be more significant than in other transmission schemes, similar challenges may also arise using non-electrical signals, for instance, magnetic signals, optical signals or other signals to transmit or exchange data. Moreover, similar challenges may also arise in systems which are not vehicle-based systems. Also in other fields of technology, comparable situations may exist including non-high volume architectures and/or non-low cost applications.

SUMMARY

Therefore, a demand exists to improve a trade-off between the robustness of a system, in which data are transmitted even under adverse operational conditions, simplifying such an implementation or architecture and the available bandwidth for transmitting data.

This demand may be satisfied by a receiver or a method according to any of the independent claims.

A receiver comprises a receiver circuit to receive a pulse width encoded signal and a sampling circuit to determine a position of a transition of the pulse of the signal by oversampling the received signal with respect to a quantization function and to generate a signal indicating an unexpected event, when the determined position of the transition deviates from an expected position according to the quantization function by more than a predetermined range. The quantization function maps a plurality of expected positions to a plurality of values.

It may be possible to improve the previously-mentioned trade-off between the robustness of such a system even under adverse operation conditions, simplifying the implementation and the available bandwidth of the infrastructure by using a receiver, which verifies as to whether the transition of a pulse falls into the predetermined range with respect to an expected position or if it deviates from the expected position by more than the predetermined range. In the latter case the receiver assumes an unexpected event, for instance a distortion interfering with a signal comprising the pulse and the transition. In this case, the sampling circuit of the receiver generates a signal indicating the unexpected event.

Therefore, by employing a comparably simple oversampling technique, it may be possible to detect unexpected events on the receiver side and to react in response to the generated signal to the unexpected event. This may allow to detect distortions and, therefore, to increase the robustness of the transmission scheme while limiting the impact on the complexity of the implementation and the available bandwidth.

Optionally, in a receiver the sampling circuit may be configured to determine a received value of a plurality of values based on the quantization function and an expected position corresponding to the received value, when the determined position of the transition falls within the predetermined range around the expected position corresponding to the received value. The sampling circuit may therefore be capable of determining the received value based on the position of the transition of the pulse, when the determined position falls within the predetermined range around the expected position of the received value.

The predetermined ranges may be arranged symmetrically around their respective expected values or they may be asymmetrically arranged around their respective expected positions. Hence, the expected positions may form midpoints of the predetermined ranges or may be located away from the respective midpoints of the predetermined ranges.

Additionally or alternatively, the receiver may be configured to disregard a message comprising a received value of the plurality of values, when the sampling circuit has generated the signal indicating an unexpected event. This may allow the receiver or other parts of a system comprising the receiver to process messages comprising a received value, which may be disturbed by a distortion or a similar unexpected event. In other words, the robustness of a system comprising such a receiver may be increased by discarding messages, in which one or more received values of the respective message may be faulty due to the occurrence of an unexpected event.

Additionally or alternatively, the predetermined range may correspond to at the most 30% of a distance between two neighboring expected positions. Using a predetermined range of that size may allow on the one hand a reliable determination of unexpected events while a complexity of the implementation of the receiver may still be comparably simple on the other hand. For instance, it may be possible to use smaller values for the predetermined range, for instance, of at the most 20% or even of at the most 15% or of at most 10%. The smaller the predetermined range is with respect to the distance between two neighboring expected positions, the more sensitive the receiver becomes with respect to unexpected events such as distortions. However, the smaller the predetermined range, the more complex the implementation of the receiver may become.

Objects, structures, data, values or the like may be neighboring, when between the respective objects, structures, data or values there is no further object, structure, datum or value of the same kind arranged in between. Accordingly, two objects, structures, data or values may be adjacent when the two objects, structures, data or values are direct neighbors, for instance when they are directly in contact or adjoining.

Additionally or alternatively, in a receiver, the predetermined range around the expected position may be given by a predefined number of samples according to a sampling time resolution of the received oversampled signal. This may allow simplifying the implementation of the receiver since the predetermined range may be determined by implementing a counter. The predefined number of samples may be fixed, programmable or changeable.

Additionally or alternatively, in a receiver the predetermined ranges for the expected positions of the plurality of expected positions may be equally sized. This may further allow simplifying an implementation of the receiver since variations of the predetermined ranges depending on the expected positions, the values associated with the expected positions or other parameters may be avoided.

Additionally or alternatively, in a receiver the predetermined ranges around the expected positions are based on a predefined fraction of the values corresponding to the expected positions according to the quantization function. This may allow the receiver to determine the presence of an unexpected event based on the values associated with the expected positions. The predefined fraction may be equal for some or all predetermined ranges around the expected positions. The predefined fractions may be fixed, programmable or changeable.

Additionally or alternatively, in a receiver the distances between neighboring expected positions according to the quantization function may be equal. This may allow further simplifying an implementation of the receiver since the distances between neighboring respective positions do not vary and may be constant for all expected positions. For instance, this may allow determining the expected position indicating the received value with respect to the position of the received transition by using a counter and to analyze the counter value based on a linear relation.

Additionally or alternatively, in a receiver the quantization function may be monotone. For instance, the quantization function may be strictly monotone. The quantization function may, for instance, map the plurality of expected positions arranged in an ascending order to the plurality of values arranged in an ascending order. This may also allow simplifying an implementation of the receiver.

Additionally or alternatively, in a receiver, the quantization function may map the plurality of expected positions to a plurality of integer values. By using integer values it may be possible to further simplify an implementation of the receiver. Optionally, in such a receiver, a maximum difference between neighboring integer values of a plurality of integer values may be equal to one, when the plurality of integer values is arranged in an ascending order. This may allow simplifying an implementation of the receiver further. For instance, it may be possible to disregard one or more of the least significant bits in a digital counter implementation or to employ another transformation to map the position of the received transition to the corresponding received value, depending on the implementation and, for instance, the oversampling employed.

Additionally or alternatively, the receiver may be configured to receive the signal comprising a further transition before the transition, wherein the value is encoded in a time period between the further transition and the transition. This may allow a more reliable encoding of the value in the signal.

Optionally, in a receiver, the quantization function may map the determined position of the transition to the value by subtracting a predefined offset from the time period between the further transition and the transition. This may allow simplifying an implementation of the receiver by implementing a comparably simple subtraction. The predefined offset may be fixed, programmable or changeable. The predefined offset may be given in any suitable unit, for instance, based on an operating frequency of the receiver, the receiver circuit or the sampling circuit, or any time unit derived from the operating frequency of the mentioned components.

Additionally or alternatively, the receiver may be configured to receive the signal comprising the further transition and the transition as transitions in a common first direction. This may allow a more reliable determination of a value encoded in the signal since an asymmetry concerning a rise time a drop time between the signal levels used for the transition and the further transition may be of less importance. Due to the transition and the further transition sharing the same direction, for instance, from a lower signal level to a higher signal level or from a higher signal to a lower signal level, it may be possible to eliminate or at least to reduce effects caused by an asymmetry between the rise time and the drop time of the signal.

Optionally, the receiver may be configured to receive the signal further comprising an intermediate transition in an opposite second direction, wherein the intermediate transition is positioned between the further transition and the transition. This may further allow improving an accuracy of the encoding and the decoding of the value comprised in the signal. For instance, the intermediate transition may be used as a transition from a second signal level to a first signal level, wherein the transition and the further transition are transitions from the first signal level to the second signal level. In other words, the intermediate transition may be a transition to bring the signal level back to the first signal level. As a consequence, it may be possible to use as the transition and the further transition transitions from the common first signal level to a common second signal level.

Additionally or alternatively, in a receiver a time resolution of the received oversampled signal may be better than the smallest distance of the plurality of expected positions. This may allow the sampling circuit to reliably determine as to whether the transition falls into a predetermined range around an expected position.

Optionally, in a receiver, the time resolution may be better by at least a factor of four than the smallest distance between the expected positions of the plurality of expected positions. This may allow the sampling circuit to reliably determine as to whether the position of the transition falls into the predetermined range around an expected position.

Additionally or alternatively, in the receiver, the receiver circuit may be configured to receive an initial sequence representing a predetermined calibration value. The sampling circuit may further be configured to determine the expected positions of the quantization function based on the comparison of the calibration value and the initial sequence. This may allow a more flexible transmission of data since the time basis of a calibration function may be provided by the transmitter intermittently, for instance regularly.

Optionally, in a receiver the initial sequence may comprise a first transition and a second transition, wherein the sampling circuit may be configured to determine the expected positions of the quantization function based on a time between the first and second transitions of the initial sequence and the calibration value. This may further allow providing the time basis for the quantization function reliably based on a similar technique used for transmitting data.

Additionally or alternatively, in a receiver the receiver circuit may be configured to receive the signal asynchronously. This may allow simplifying and implementing the receiver further since providing a clock signal to receive a time basis for the signal may be omitable.

A receiver may also be comprised in a transceiver, which further comprises a transmitter circuit configured generate a signal to be transmitted and/or to transmit the signal. The signal to be transmitted or transmitted may be a signal the receiver is configured to receive and process. However, the transmitter circuit may also use a different transmission protocol, a different transmission technique or a combination thereof. Hence, a transceiver may comprise a transmitter circuit along with a receiver as described before.

A receiver or a transceiver may be implemented as an integrated circuit comprising a substrate into which the receiver is at least partially integrated. The substrate may be a die or chip comprising a main surface and a thickness along a direction perpendicular to the main surface and a thickness along a direction perpendicular to the main surface, wherein the thickness is smaller than the extension of the die along the main surface. For instance, the thickness may be at least a factor of 10 smaller than a smallest extension of the substrate parallel to the main surface. The substrate may be a semiconductor substrate comprising a semiconducting material such as silicone (Si), gallium arsenide (GaAs) or similar materials.

The integrated circuit may be part of a discrete device. However, a receiver or a transceiver may also be implemented as a discrete device comprising not just a single substrate, die or chip, but may be distributed over several substrates, dies or chips. The plurality of substrates, dies or chips may be arranged or contained in a single package. For instance, all parts of the discrete device may be manufactured in a single process sequence such as a semiconductor wafer process to fabricate the discrete device. Sometimes, parts of the discrete device may be manufactured after a typical microelectronic wafer manufacturing process. In order not to pollute the wafer fabrication, it may be possible to apply a final passivation layer protecting the circuit and other elements before attaching larger, separate objects including, for instance, terminals of the discrete device or the like.

Moreover, a discrete device may undergo a functional test before it is assembled into a more complex component or system. If such a task has been carried out, the individual parts that went through this test may be considered a discrete device. For instance, the test may comprise a simplified test procedure allowing to verifying if the discrete device works and if it performs in the expected limits. For instance, the test may be used to see if an additional calibration may be unnecessary, advisable or even necessary. For instance, to store additional calibration data, the discrete device may comprise storage locations to store the calibration data.

A storage location may comprise one or more storage cells of the same or of different types. The storage cells may be implemented as volatile or non-volatile storage cells. A non-volatile storage cell may be based on random access memory (RAM) technology, while a non-volatile storage cell may be based, for instance, on electrically erasable and programmable read-only memory (EEPROM) technology, optical storage technology, magnetic storage technology or the like.

A method for receiving a signal comprises receiving a pulse width encoded signal, determining a position of a transition of the pulse of the signal by oversampling the reference signal with respect to a quantization function, and generating a signal indicating an unexpected event, when the determined position of the transition deviates from an expected position according to the quantization function by more than a predetermined range. The quantization function maps a plurality of expected positions to a plurality of values.

A program comprises a program code configured to perform such a method, when the program is executed on a programmable hardware. The program may be stored on a machine-readable storage medium which includes the program code and which causes the machine to perform the method when executed. The machine-readable storage medium may, for instance, include machine-readable instructions, which, when executed, implement a method or realize a receiver as described before. A programmable hardware may, for instance, comprise a processor, a central processing unit (CPU), a graphical processing unit (GPU), a field programmable gate array (FPGA), a system on chip (SOC) or any other form of programmable hardware. The program may, for instance, comprise software or firmware, which may, for instance, be stored in the previously-mentioned machine-readable storage medium. Such a machine-readable storage medium may, for instance, comprise one or more memory locations as described before.

Mechanical components may be coupled to one another directly or indirectly via a further component. Electrical and other components can be coupled to one another directly or indirectly in such a way that information carrying or informing comprising signals can be interchanged or sent from one component to the other component. Moreover, electrical and other components can be electrically coupled directly or indirectly to provide them with electrical energy, for instance, by providing a supply voltage and a supply current to the respective components.

Information carrying signals or information comprising signals can be sent, provided or interchanged, for instance, using electrical, optical, magnetic or radio signals. The signals can be in terms of their values and their timely sequence independent from one another be discrete or continuous. For instance, the signals may be analog or digital signals According to some possible implementations, a receiver may comprise: a receiver circuit to receive a pulse width encoded signal; and a sampling circuit to: determine a position of a transition of a pulse of the pulse width encoded signal by oversampling the pulse width encoded signal with respect to a quantization function, determine that the position of the transition deviates from an expected position, of a plurality of expected positions, according to the quantization function by more than a predetermined range, generate a signal, indicating an unexpected event, based on determining that the position of the transition deviates from the expected position, detect an error in a message corresponding to the pulse width encoded signal based on a check value identified from the pulse width encoded signal, and adjust, based on detecting the error and based on the signal indicating the unexpected event, a value corresponding to the position of the transition, where the value, corresponding to the position of the transition, may be adjusted to cause the error in the message to be corrected. In some implementations, the check value is a 4-bit cyclic redundancy check value.

BRIEF DESCRIPTION OF THE DRAWINGS

Several embodiments of the present invention will be described in the enclosed Figures.

DETAILED DESCRIPTION

Figure 1:
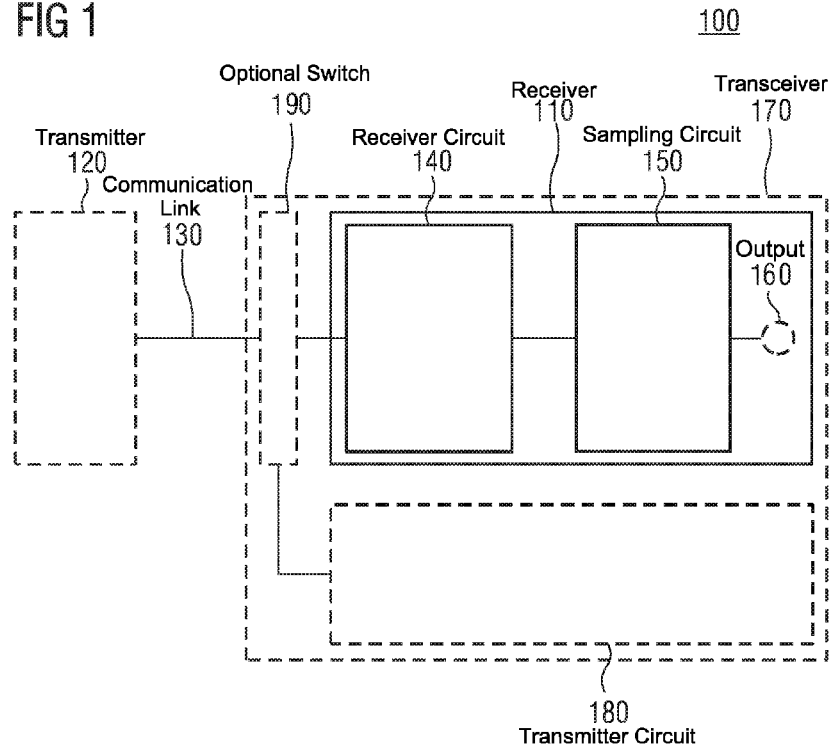
FIG. 1 shows a simplified block diagram of a communication system comprising a receiver.

In the following, embodiments according to the present invention will be described in more detail. In this context, summarizing reference signs will be used to describe several objects simultaneously or to describe common features, dimensions, characteristics, or the like of these objects. The summarizing reference signs are based on their individual reference signs. Moreover, objects appearing in several embodiments or several figures, but which are identical or at least similar in terms of at least some of their functions or structural features, will be denoted with the same or similar reference signs. To avoid unnecessary repetitions, parts of the description referring to such objects also relate to the corresponding objects of the different embodiments or the different figures, unless explicitly or—taking the context of the description and the figures into account—implicitly stated otherwise. Therefore, similar or related objects may be implemented with at least some identical or similar features, dimensions, and characteristics, but may be also implemented with differing properties.

In many fields of technology, a demand exists to allow components of a system to transmit data from one component to another using, for instance, a digital transmission scheme. Sometimes, the communication is not uni-directional but bi-directional allowing an exchange of data, commands, status information or the like. In the following description, information to be transmitted from one component to another component will be referred to as data irrespective of their content or their meaning. For instance, in the following description, status information, commands as well as other values or data will be referred to as data.

In these applications often very different design goals have to be taken into consideration. However, in many cases a robust transmission of data with respect to distortions, a simple implementation allowing and yet a high bandwidth for transmitting data represent important design goals. As a consequence, in many fields of technology, a demand exists to improve a trade-off between these parameters.

Examples come, for instance, from high-volume and/or low-cost implementations, in which technically simple and, hence, cost-efficient solutions may be important. For instance, in the field of components for an intra-vehicle communication, the individual components are often subjected to significant distortions and operating under difficult environmental influences including large variations of temperature, moisture and mechanical vibrations. For instance, electromagnetic bursts may couple into electrical or electronic communication systems caused, for instance, by ignition systems, power control systems, or the like.

However, even under those more difficult operational conditions, components are often required to operate reliably and to be able to transmit and/or to receive data at a sufficiently high rate. In the case of vehicle-related systems, this may be important, for instance, for safety-related systems and components, which may directly or indirectly influence the passengers' or the vehicle's safety. An example comes from the field of sensors and sensor-related applications. For instance, in the case of a motorized vehicle, sensors may be used to monitor rotational angles, angular velocities or other parameters.

Due to the number of different sensors comprised in a car, a motorcycle, a truck or a similar vehicle, the sensors as well as their control units are subjected to corresponding cost pressure, favoring technically more simple solutions, which should provide the possibility of a sufficiently high bandwidth as well as a robust transmission of data. By providing a bus system or a communication system with a sufficiently high bandwidth, it may be possible to reduce a total number of bus systems or communication systems by coupling more components to a single bus or communication system.

Although in the example described above, a vehicle-related application scenario has been described, in other fields of technology similar challenges exist, which lead to similar demands. Therefore, without a loss of generality, in the following reference will be made to a vehicle-related application, although similar examples may equally well be employed in other fields of applications and other fields of technology.

In the following a transmission technology will be described which is based mostly on using electrical signals to transmit data. For instance, data may be encoded in an electrical voltage and/or an electrical current being modulated or changed to transmit the data. For instance, in the protocols described below, a datum or piece of information is transmitted or received, which may comprise in principal any number of different states. However, in the following a bit-based transmission protocol will be considered more closely, in which an individual datum may comprise a specified number of bits, which translates into a corresponding number of different states. For instance, in the case of a nibble-based protocol, each datum comprises 4 bits so that 16 (=24) different states may be transmitted. In other fields of application, the number of bits may vary. Moreover, it is by far not required to implement a bit-based transmission scheme. In principle, any number of states instead of the power of 2 (2n, n being an integer) may be used.

Examples of corresponding protocols comprise, for instance, SPC (short PWM codes; PWM=pulse width modulation) or SENT (single-edge nibble transmission). Both protocols are based on a PWM encoding scheme for transmitting nibbles or multiples of nibbles. Each of the nibbles comprises exactly 4 bits.

In the following examples, the information or data to be transmitted is encoded in falling edges. In other examples, rising edges or any combination of rising and falling edges may be used to encode data.

As outlined before, instead of electrical electronic transmission schemes, also other transmission schemes including, for instance, optical transmission schemes, magnetic transmission schemes or wireless transmission schemes may be used to transmit or receive data.

FIG. 1 shows a simplified block diagram of a communication system 100 comprising a receiver 110 and a transmitter 120. The transmitter 120 and the receiver 110 are coupled to one another via a communication link 130, which may be specifically designed to transmit data from the transmitter 120 in a form generated by the transmitter 120 to the receiver 110. The communication link 130 may be, for instance, configured to transmit electrical signals, although in other examples the communication link 130 may equally well be specifically designed to transmit optical signals, magnetic signals or other signals.

In some examples, the communication link 130 may eventually be replaced by a wireless communication link employing, for instance, a radio-based transmission scheme. Moreover, the communication link 130 may be a magnetic communication link.

In the case of an electrical transmission scheme, the communication link 130 may comprise one or more electrically-conductive lines or wires. These conductive lines or wires may, for instance, form an electrical bus to transmit data serially or in parallel. In other examples, the communication link 130 may comprise one or more optical fibers to transmit optical signals from the transmitter 120 to the receiver 110.

The receiver 110 comprises a receiver circuit 140, which is designed to receive a pulse width encoded signal, and a sampling circuit 150, which is coupled to the receiver circuit 140 and designed to determine a position of a transition of a pulse of the signal by oversampling the received signal with respect to a quantization function. The quantization functions maps a plurality of expected positions to a plurality of values. As will be laid out in more detail below, the sampling circuit 150 may generate a signal indicating an unexpected event, when the determined position of the transition deviates from an expected position according to the quantization function by more than a predetermined range. The signal indicating the unexpected event may, for instance, be accessible to other parts at an output 160. Depending on the implementation, the output 160 may comprise an electrical signal line to provide the signal indicating the unexpected event as an electrical signal or in any other form. For instance, the signal indicating the unexpected event may also be an optical signal, such that the output 160 may comprise, for instance, a light source such as a light-emitting diode (LED), a semiconductor laser or the like. Similarly, the output 160 may be designed to generate or provide a magnetic signal. In this case, the output 160 may, for instance, comprise a magnetic coil or the like.

In case of a processor-based implementation, the output 160 may comprise a storage location, in which at least one bit can be stored at least temporarily. A storage location may, for instance, comprise any suitable volatile or non-volatile storage cell as discussed before.

The receiver circuit 140 may, for instance, be specifically designed to physically receive signal transported via the communication link 130. The receiver circuit 140 may, for instance, comprise filters, amplifiers or other corresponding analog and/or digital circuits.

Before further details concerning the receiver 110 will be described in context with the schematic representation or diagram of a signal, which the receiver 110 is capable of processing, it should be noted that the receiver 110 may also be part of a larger component such as, for instance, a transceiver 170. The transceiver 170 may comprise a transmitter circuit 180, which is also coupled to the communication link 130 and designed to generate a signal to be sent over the communication link 130. To couple both the receiver 110 and the transmitter circuit 180 to the communication link 130, an optional switch 190 or a similar multiplexer or coupler may be implemented to allow both the receiver 110 and the transmitter circuit 180 to access the communication link 130 alternately or simultaneously.

The transmitter circuit 180 may be designed to generate a signal similar to the one the receiver 110 may receive, but may also generate a signal different from the signal to be received by the receiver 110. For instance, a transmitter circuit 180 may use a different transmission protocol and/or a different transmission technology. As a consequence, the communication link 130 may be designed to transmit signals based on different transmission protocols or the like. In another example, the transceiver 170 may be coupled to a different communication link 130 which is, however, not shown in FIG. 1 for the sake of simplicity only. This additional communication link would be an optional component, which may render the optional switch omitable.

Figure 2:
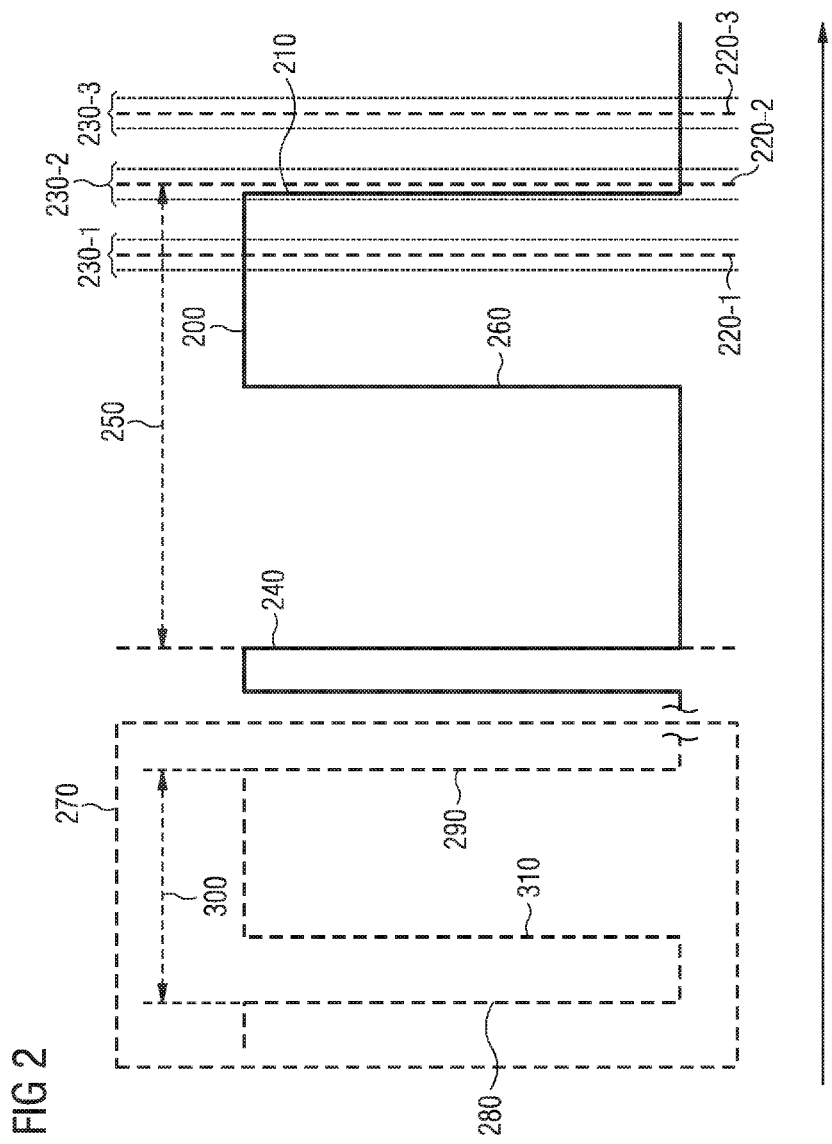
FIG. 2 shows a simplified diagram of a sequence of a signal to illustrate an operation if a receiver.

FIG. 2 shows a schematic diagram of a signal which the receiver 110 can receive and process. The signal is, to be more precise, a pulse width encoded signal comprising a pulse 200 with a transition 210 on the basis of which the sampling circuit 150 is capable of obtaining a received value of a plurality of values by comparing the position of the transition 210 with a corresponding plurality of expected positions. The quantization function maps each of the expected positions to one value of the plurality of values. For instance, the sampling circuit 150 may determine by oversampling the received signal a position of a transition 210 and compare the position of the transition 210 to the expected positions according to the quantization function. For instance, on basis of the expected transition having the smallest distance to the position of the transition 210 the sampling circuit 150 may determine the value encoded in the signal using the quantization function. This value may be referred to as the received value.

To explain this a little further, FIG. 2 comprises a plurality of expected positions 220-1, 220-2 and 220-3. A distance of a position of a transition 210 from the expected position 220-2 is smaller than a distance of a position of the transition 210 from the expected position 220-1 as well as from the expected position 220-3. Therefore, based on a quantization function, mapping to the three expected positions 220 depicted in FIG. 2 three values, the received value may be the one associated by the quantization function to the expected position 220-2. The values attributed to the expected positions may be different from one another.

Figure 4:
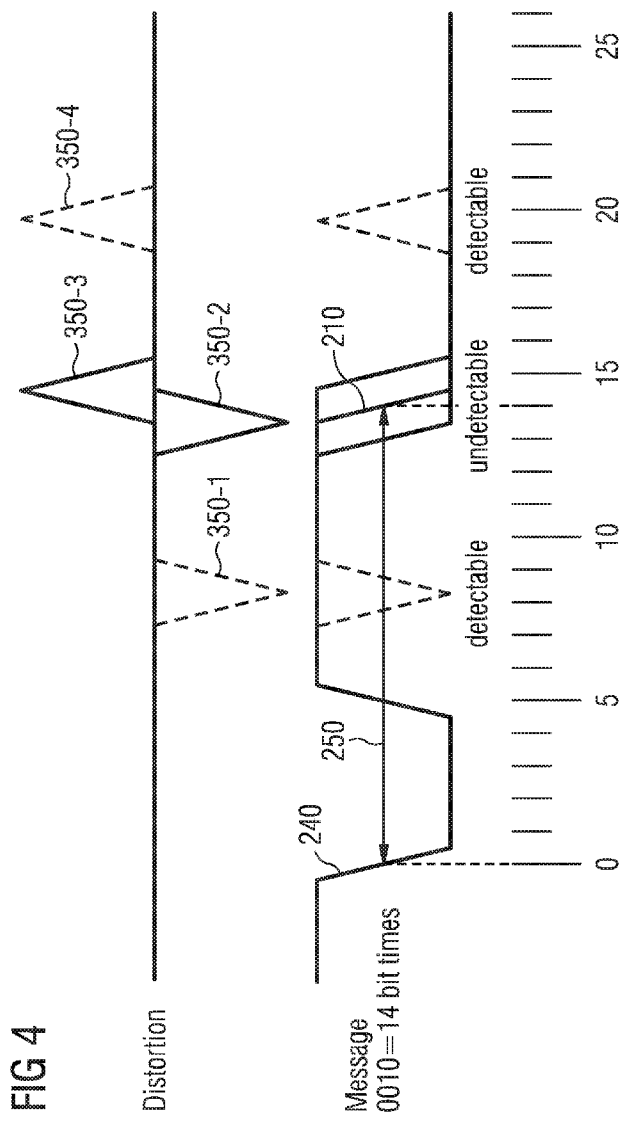
FIG. 4 illustrates a superposition of a signal with a distortion.

However, the signal may be subjected to distortions as will be outlined in more detail in the context of FIG. 4. Therefore, the intended position of a transition 210 may be superimposed by such a distortion leading to a shift of the position of the transition 210. Due to the interference of that distortion, it may happen that the transmitted signal may be altered in terms of the value to be transmitted by the distortion.

To be able to detect such a situation, the sampling circuit 150 compares the position of the transition 210 not only to the expected positions 220 but also verifies as to whether the determined position of the transition 210 deviates from the expected positions 220 corresponding to the received value by more than a predetermined range 230. In FIG. 2 predetermined ranges 230-1, 230-2 and 230-3 corresponding to the expected positions 220-1, 220-2 and 220-3, respectively, are shown by dotted lines. In the example depicted in FIG. 2, the position of the transition 210 falls well within the predetermined range 230-2 of the expected position 220-2. As a consequence, the sampling circuit may determine the value corresponding to the expected position 220-2 as the received value.

In case, however, the transition 210 would deviate from the expected position 220 according to the quantization function by more than the corresponding predetermined range 230, the sampling circuit 150 may generate the previously-mentioned signal indicating the unexpected event.

The sampling circuit 150 uses an oversampling technique for the received signal to verify as to whether the position of the transition 210 falls within the predetermined range 230 of the corresponding expected position 220. For instance, the sampling circuit may operate at an operational frequency being higher than a frequency corresponding to a distance between the expected positions 220. In other words, a time resolution of the received oversampled signal may be better than a smallest distance of the plurality of the expected positions 220. Both determining the relevant expected position 220 having, for instance, the smallest distant from the position of the transition 210 as well as the question as to whether the position of the transition 210 falls in the predetermined range 230 may then, for instance, be determined by employing a counter. For instance, to enable the sampling circuit 150 to verify as to whether the position of the transition 210 deviates from the expected positions 220 by more than the corresponding predetermined range 230, the time resolution may be chosen to be better by at least a factor of 4 than the smallest distance between the expected positions 220 of a plurality of expected positions. In other examples, the corresponding factor may be higher, for instance, at least a factor of 6, at least a factor of 8 or at least a factor of 10.

Based on the time resolution used for oversampling the received signal, the size of the predetermined regions 230 may be determined. For instance, the predetermined range may correspond to at the most 30%, at the most 20% or to at the most 10% of a distance between two neighboring expected positions 220.

In an implementation, in which the sampling circuit 150 uses a counter to determine as to whether the position of the transition 210 falls within the predetermined region 230 around the corresponding expected position 220, the predetermined range may, for instance, be given by a predefined number of samples according to a sampling time resolution of the received oversampled signal. Moreover, to simplify the implementation of the receiver 110 even further, it may be possible to implement the sampling circuit 150 such that the predetermined ranges 230 for the expected position 220 of the plurality of expected positions 220 are equally sized.

However, in other examples, the predetermined ranges 230 are at the expected positions 220 may also be based on a predefined fraction of the values corresponding to the respective expected positions 220 according to the quantization function. For instance, the predefined fraction may be 30%, 20% or 10% to give just some examples. The fraction may generally speaking be smaller than 50% in the case of a symmetric arrangement of the predetermined ranges 230 with respect to the expected positions 220. However, in other examples, the expected positions 220 are by far not required to be in the center or midpoint of the predetermined ranges 230.

In terms of the quantization function and the expected positions 220 on the basis of which the quantization function maps the values to the corresponding expected positions 220, the distances between neighboring expected positions 220 according to the quantization functions may be equal. Such an example is depicted in FIG. 2, where the distances between the expected positions 220-1, 220-2 is equal to the distance between the expected positions 220-2 and 220-3.

The quantization function assigning or attributing to each of the expected positions 220 a value or a plurality of values may be monotone. For instance, the quantization function may be monotonically or monotonically increasing. In the first case, the quantization function may, for instance, map the plurality of expected positions 220 arranged in an ascending order to the plurality of values in an ascending order. In the latter case, the situation may be reversed. Here the quantization function may map the plurality of expected positions 220 when being arranged in an ascending order to the plurality of values arranged in a descending order. The values mapped by the quantization function may, for instance, be integer values. A maximum difference between neighboring integer values may be one, when the plurality of integer values is arranged in an ascending order. For instance, the first expected position 220-1 may be mapped to an integer j, the second expected position 220-2 to the integer (j+1), the third expected position 220-3 to the integer (j+2) and so on. In other words, the quantization function may map to the expected positions 220 arranged in the ascending order integer values being one smaller or larger than the preceding value mapped to the preceding expected position 220.

Although in FIG. 2 a quantization function mapping three expected positions 220-1, 220-2 and 220-3 to three values is implicitly shown, the quantization function and the sampling circuit 150 may be designed to map any number of expected positions 220 to corresponding values. In other words, the quantization function may have less expected positions 220, but also a larger number of expected positions. The number of expected positions 220 may, for instance, correspond to the number of states a single datum can acquire. In the case of a single bit to be transmitted, a quantization function comprising only two different states, and hence two different expected positions 220, may suffice. On the other hand, when a nibble with its 4 bits is to be transmitted, in principle 16 different states and, hence, 16 different expected positions 220 should be mapped to the different values. In the case of 6 bits, the number of expected positions climbs to 64 (=26) and in the case of a byte with 8 bits, the number of expected positions may rise up to 256 (=28) different expected positions 220.

However, as outlined before, it is by far not necessary to use a bit-based transmission scheme. In the case of a bit-based transmission scheme with a datum comprising n bits, the number of expected positions 220 may, for instance, comprise 2n different expected positions 220. However, any other number may also be used in the framework of quantization functions.

The receiver 110 and, for instance, its sampling circuit 150 may be configured to receive the signal comprising a further transition 240, which is located before the transition 210. The value to be transmitted may then be encoded in a time period 250 between the further transition 240 and the transition 210. Although the transition 210 as well as a further transition 240 may be in principle be transitions in different directions, a more reliable transmission of data may eventually be achievable when using for the transition 210 as well as the further transition 240 transitions in a common first direction. As a consequence, it may be possible to reduce an impact or even eliminate an impact of symmetries caused by the transmitter 120 for rising edges and falling edges. However, it should be noted that in FIG. 2 the form and duration of the rising or falling edges has been neglected for the sake of simplicity only.

To allow the transition 210 as well as a further transition 240 to be transitions in the common first direction, and to use only two signal levels, the receiver 110 may be designed to receive the signal further comprising an intermediate transition 260 in an opposite second direction. The intermediate transition 260 may then be positioned between the further transition 240 and the transition 210. As a consequence, it may be possible to implement the transmitter 120 as well as the receiver 110 such that the transitions 210, 240 and 260 each cause the signal to change between a first and second signal level. However, the transition 210 as well as the further transition 240 are directed in an opposite direction compared to the intermediate transition 260.

The quantization function may, for instance, map the corresponding values to the expected positions 220 by subtracting an offset from the time period 250 between the further transition 240 and the transition 210. Depending on the implementation, the offset may be fixed or changeable, for instance programmable.

As a precautionary measure, the receiver 110 may, for instance, discard or disregard a message comprising a received value, when the sampling circuit 150 has generated the signal indicating an unexpected event during the reception of the message. The presence of the signal indicating the unexpected event may, for instance, be interpreted as an increased probability that a distortion has interfered with a transmission so that the value received and decoded by the sampling circuit 150 may have been distorted. In this case, it may be safer to disregard or discard the complete message instead of operating the system comprising the receiver based on the value which may have been distorted.

A receiver 110 may be capable of operating and, hence, receiving the signal asynchronously. This may allow the designer of a system comprising such a receiver to omit providing the receiver 110 with a clock signal for clocking purposes. Instead, a common time basis of the transmitter 120 and the receiver 100 may be shared differently. For instance, the receiver 110 may be configured to receive an initial sequence to 270 representing a predetermined calibration value. The sampling circuit 150 may then be designed to determine the expected positions 220 based on a comparison of the calibration value and the initial sequence 270. For instance, the initial sequence 270 may comprise a first transition 280 and a second transition 290 following the first transition. A time 300 between the first and second transitions 280, 290 may then be used as a time basis to determine the expected positions 220. For instance, a time unit or tick may be defined by dividing the calibration value by the time 300. The calibration value may be fixed or changeable, for instance programmable, depending on the implementation and standard according to which a receiver 110 operates.

Once again, the first and second transitions 280, 290 may share the same direction. As a consequence, a third transition 310 may be arranged in between the first and second transitions 280, 290. Once again, the three transitions 280, 290 and 310 may be transitions between the previously mentioned first and second signal levels.

In the following, an example coming from the automotive sector will be described in more detail. SPC and SENT use a parts modulation encoding for the transmission of 4-bit nibbles. A receiver may install an additional safety mechanism which may allow detecting faults due to an infringement of a timing specification. In a standard SENT or SPC transmission scheme N-bits cyclic redundancy check (CRC) values over all bits of a message are used. For instance, in the SENT standard, it is additionally proposed to check for the nibble length only for the synchronization pulse. Values of +/−1.5% may be used which is less than the resolution of this pulse, which in turn is +/−1/56, which corresponds to +/−1.79%. A receiver 110 defines a range of fractional nibble length measurements which are not accepted by the receiver 110. This may allow an implementation of a further safety measure on top or alternatively to the CRC value verification, which increases the probability to detect transmission faults.

Figure 3:
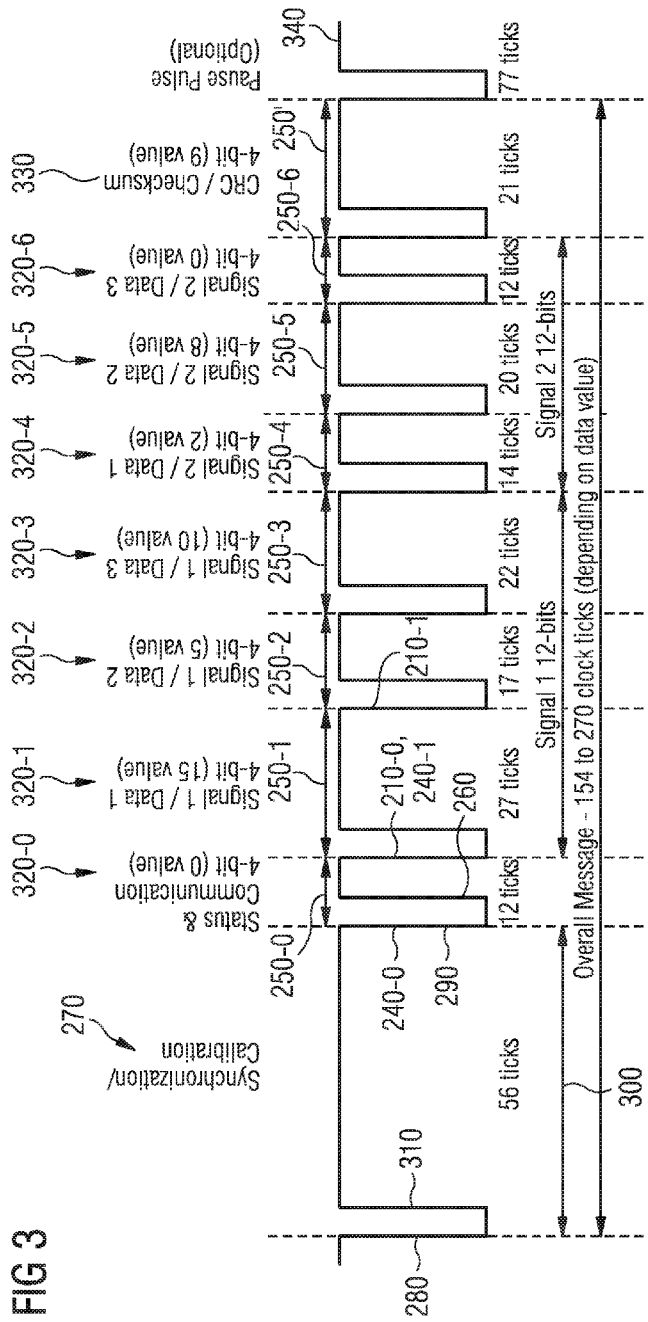
FIG. 3 shows a simplified sequence of a SPC- or SENT-based signal.

FIG. 3 shows an example of an encoding scheme for two 12 bit signals. To be more precise, FIG. 3 shows a schematic diagram of a signal having an overall message length of 154 to 270 clock ticks depending on the values to be transmitted. A minimum nibble period may, for instance, correspond to 36 μs at a length of 3 μs per clock tick. This corresponds to a minimum nibble length of 12 ticks (36 μs=12 ticks·3 μs/tick). A nibble encoded period of time may, for instance, correspond to 36 μs plus j-times 3 μs, where j is an integer in the range from 0 to 15 (Tnibble=j·3 μs; j=0, . . . , 15). In other words, a quantization function maps the expected positions, which are separated by one tick and which are equally spaced to the values 0 to 15 according to an ascending order of the expected positions 220. The offset value used to determine the received value by subtracting it from the time period 250 is here 12 ticks or the previously mentioned 36 μs.

However, before the description of the schematic representation of FIG. 3 is continued, it should be noted that this merely represents an example. Other implementations and examples may have a higher or lower frequency corresponding to a higher or lower time per tick, respectively. Moreover, all other parameters including, for instance, the directions of the transitions, the calibration value, and the offset may be implemented differently.

The schematic diagram of FIG. 3, once again comprises an initial sequence 270 comprising a first transition 280, a second transition 290 and a third transition 310 arranged in between the first and second transitions. The time 300 between the first and second transitions 280, 290 corresponds to a calibration value of 56 ticks. Based on this calibration value, the time 300 results in a common time basis used by the transmitter 120 generating the signal shown in FIG. 3 and the receiver 110 receiving the signal. Using this common time basis allows the receiver 110 to decode the values comprised in the signal or message. In other words, the initial sequence 270 allows the signal to be asynchronously transmitted.

A SENT standard defines its messages depending on the length of two adjacent falling edges or transitions. In order to provide the time basis that allows to decode the messages of a sensor or a similar device that have a time basis, which has a low precision and may depend on temperature as well, the first pulse comprised in the initial sequence 270 in every frame has a fixed length of 56 ticks. The time 300 of this initial pulse is measured by the receiver 110 and divided by the known length or calibration value of 56 to extract the actual tick length that is generated by the transmitter 120 or the transmitting sensor. The extracted tick length may then be used to decode the information of the following nibbles.

The message as depicted in FIG. 3 comprises apart from the initial sequence 270 a plurality of packages 320-0, 320-1, . . . , 320-6 as well as a check value 330 (e.g., a check sum). The plurality of packages 320 comprises as an initial package 320-1 a status and communication value which is encoded in the example depicted in FIG. 3 by a nibble comprising the previously mentioned 4 bits. The initial package 320-0 comprises the value 0 so that a time period 250 between the transition 210 and the further transition 240 corresponds to 12 ticks based on the time basis established by the initial sequence 270. It should be noted that in the example depicted here the further transition 240 corresponds to the second transition 290 of the initial sequence 270. In between the transition 210 and the further transition 240, the intermediate transition 260 is arranged.

Similarly, the plurality of packages further comprises 6 packages 320-1, . . . , 320-6 each comprises 4 bits of data which are also encoded as a sum of the offset value (12 ticks in the example here) added to the integer value of the 4 bits·1 tick. For instance, the first package 320-1 corresponds to a value of 50 so that a time period 250-1 between the corresponding transition 210-1 and the corresponding further transition 240-1 has a length of 27 ticks. The length of the time period 250-1 is the sum of the offset of 12 ticks plus the integer value of 15·1 tick. It should be noted that the transition 210-0 of the initial package 320-0 and the further transition 240-1 of the first package 320-1 correspond to one another. Similarly, in the example depicted the transition 210-$k$ of the package 320-$k$ corresponds to the further transition 240-($k$+1) of the following package 320-($k$+1), where k is an integer in the range between 1 and 5.

Similarly, the time period 250-2 corresponding to a value of 5 has a length of 17 ticks, the time period 250-3 of the third data package 320-3 corresponding to a value of 10 has a length of 22 ticks, the time period 250-4 of the fourth data package 320-4 has a length of 14 ticks corresponding to a value of 2, the time period 250-5 of the fifth data package 320-5 has a length of 20 ticks corresponding to a value of 8 and the time period 250-6 of the sixth data package 320-6 has a length of 12 ticks corresponding to a value of 0. The first three data packages 320-1, 320-2, 320-3 may represent 12 bits of a first signal, while the data packages 320-4, 320-5 and 320-6 correspond to 12 bits of a second signal.

The data packages 320 are followed by the check values 330 encoded in a corresponding time period 250' having a length of 21 ticks corresponding to a value of 9. The check value 330 comprises in the example depicted here also 4 bits and may, for instance, represent a CRC value of the data packages 320-1, . . . , 320-6.

In some implementations, the check value 330 may be used in combination with a detection of an unexpected event in order to provide precise error correction (e.g., as compared to error correction using only the check value 330). For example, the receiver 110 (e.g., the receiver circuit 140, the sampling circuit 150) may determine, based on the check value 330 (e.g., a 4-bit CRC value), that an error is present in a received message derived from a pulse width encoded signal. Here, the receiver 110 may identify, based on a signal indicating an unexpected event generated by the sampling circuit 150, a location (e.g., a particular transition) in the pulse width encoded signal at which the unexpected event occurred. Here, the unexpected event in the pulse width encoded signal may be the cause of the error in the received message.

In this example, the receiver 110 may adjust a value, corresponding to the transition (e.g., by adding one to the value, by subtracting one from the value, or the like), and may determine an adjusted message based on the adjusted value. Next, the receiver 110 may determine, based the adjusted message, whether the check value 330 indicates that the adjusted message includes an error. In a case where an error is present in the adjusted message, the receiver 110 may readjust the value (e.g., by subtracting one from the value instead of adding one to the value, by adding one to the value instead of subtracting one from the value), determine a readjusted message based on the readjusted value, and may determine whether the readjusted message includes an error. The receiver 110 may repeat this process (e.g., with additional adjustments) as needed in order to correct the error in the received message. In this way, error correction may be improved by combining a transition timing check and error detection using the check value 330. In some implementations, the receiver 110 may correct an error in a message associated with multiple unexpected events in a similar manner (e.g., by using different combinations of adjustments to adjust values at multiple transitions, and re-checking using the check value 330 for each combination of adjustments).

The check value 330 may be followed by an optional pause pulse 340. The pause pulse may, for instance, have a length of 77 ticks as indicated in FIG. 3. In order to change the message content in a way that it is not detectable by an infringement of the protocol, an interference has to appear in the proximity of one of the transitions 210, 240. In other words, to change a value of a message, a distortion may have to appear approximately at a falling edge of a protocol depicted in FIG. 3.

To illustrate this further, FIG. 4 shows the signal in the lower part representing a message having a value of 2 (binary representation: 0010), which equals based on the offset of 12 ticks to a time period 250 of 14 bit times or ticks. The horizontal axis of FIG. 4 represents the time axis in units of ticks. In the upper part of FIG. 4 distortions 350-1, 350-2, 350-3 and 350-4 are depicted. Any distortion may have a positive or negative sign compared to the current signal levels. The distortions 350 depicted in FIG. 4 are spike-shaped.

The distortions 350-1 and 350-4 represent detectable distortions, which lead to a violation of timing constraints imposed by the specification of the respective SENT standard. For instance the first distortion 350-1 would lead to a time period between a corresponding transition 210 and the further transition 240 which is smaller than the offset value of 12 ticks. Similarly, the distortion 350-4 would result in an additional transition which violates the SENT timing requirements.

However, the distortions 350-2 and 350-3 may lead to the transition 210 being shifted by one tick to a lower value and a higher value, respectively. In other words, while the transition 210 as intended would correspond to a time period of 14 ticks, the distortion 350-2 may cause the time period 250 to be shortened to 13 bit times or ticks. Similarly, the distortion 350-3 may cause the time period 250 to increase by one tick. As a consequence, any of the distortions 350-2, 350-3 may lead to an alteration of the position of the transition 210 and, hence, to a change of the time period that translates into a change of the value.

In order to increase the probability that a shift of a transition 210, 240 or—in the examples depicted here—of a falling edge infringes the protocol, a receiver 110 introduces a range of prohibited fractions of tick times that are checked when the content of the value or nibble is decoded.

Figure 5:
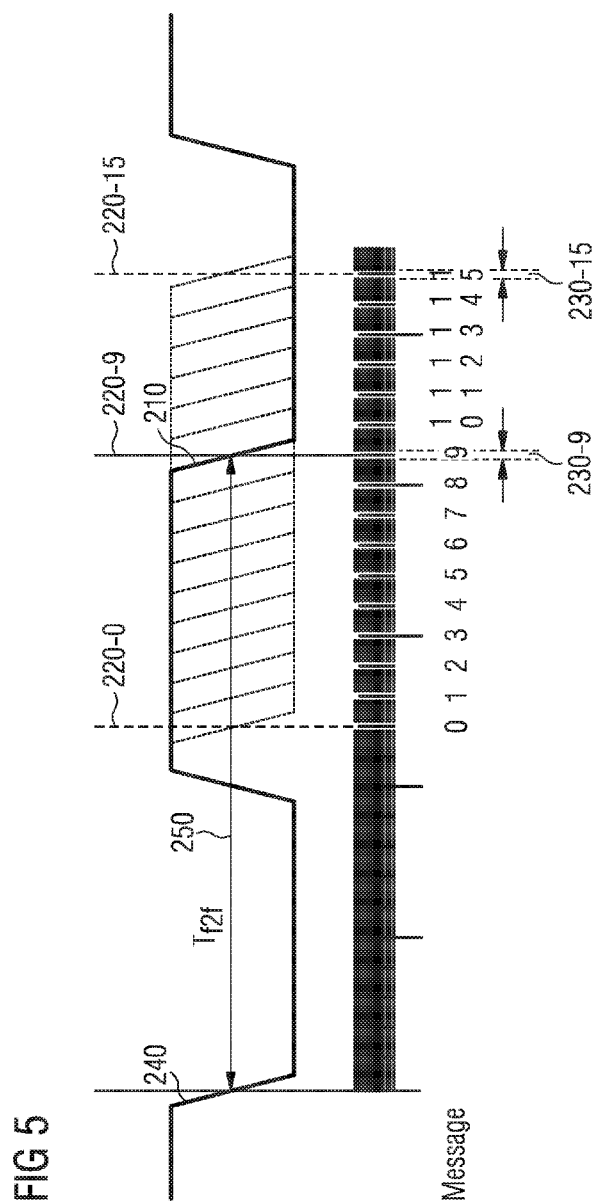
FIG. 5 shows a sequence of a signal to illustrate an operation of a receiver.

FIG. 5 illustrates this in a similar situation as depicted in FIG. 4. However, the time period 250 between the further transition 240 and the transition 210 corresponds here to a value of 9. Since in the examples depicted here the time periods 250 are taken between falling edges, the time period 250 is also referred to as Tf2f (f2f=falling-to-falling).

FIG. 5 further depicts for the values 0, 9 and 15 the expected positions 220-0, 220-9 and 220-15. For the two expected positions 220-9, 220-15 also the predetermined ranges 230-9 and 230-15, respectively, have been marked by dotted lines in FIG. 5. Whenever the transition 210 falls into the corresponding predetermined range 230-9, the encoded value may considered unaltered. If, however, the transition 210 should fall into the hashed region outside the predetermined ranges 230, the signal indicating the unexpected event may be generated by the sampling circuit 150 and, for instance, the message may be discarded or disregarded.

The predetermined ranges 230 may, for instance, correspond to a tolerance range of for instance +/−10% of the corresponding value. In other words, the predetermined range 230-9 may correspond to a value of 8.91 to 9.09 ticks or rounded to a value between 8.9 and 9.1 ticks. If the position of the transition 210 as determined by the sampling circuit 150 should fall outside the predetermined range 230-9 as mentioned, the signal indicating the unexpected event may be generated. Similarly, the predetermined range 230-15 for the expected position 220-15 corresponding to the value of 15 may comprise the values from 14.85 to 15.15 corresponding to 10% of the value mapped to the expected position 220-1 by the quantization function. In other examples a different scheme may equally well be employed. For instance, the predetermined ranges 230 may be given by an absolute tick time. For instance, in the case of an absolute tick time of +/−0.1 tick times, the predetermined ranges 230 would be equally wide. For instance, the predetermined range 230-9 correspond in this case to values between 8.9 and 9.1, while the predetermined range 230-15 corresponding to the expected position 220-15 comprises the values 14.9 to 15.1. In other examples, also other predetermined ranges 230 may be used, which may, for instance, use the time period 250 (for instance Tf2f) as a basis to define the predetermined ranges 230.

This principle can be implemented, for instance, by introducing a certain granularity of a sampling rate of the receiver 110. This may, for instance, be done by a peripheral clock of a capture and compare unit and a checking for certain limits of the received counts from a falling to a falling edge or similar transitions. For instance, such a check mechanism may be implemented similar to the check of the synchronization pulse of the initial sequence 270.

When, for instance, assuming a tick time of 1.5 µs, a peripheral clock of a central control unit of 6.7 MHz may provide already a sampling within a 10% tolerance of 1 clock tick. Doubling the sample rate may allow already a decision window of +/−two of the least significant bits of the value provided by the central control unit to decide if the edge is within the required predetermined range 230, which is also referred to as window.

If not, the whole packet or message can either be skipped or at least a warning for possible degradation of the reception can be flagged on the receiver side. On top of the above-described timing check, the variation of the timing may be checked by the following measures. For instance, the timing of the sensors or other transmitters 120 may be caused mainly due to temperature variations and aging drift. An error that appears at the falling edge of the initial 56 tick synchronization pulses of the initial sequence 270 may be detected, for instance, by comparison of the length of a neighboring synchronization pulse of a previous initial sequence 270 to be equal with a limited tolerance T_synctol, which can be much smaller than the proposed value of +/−1.5% according to the SENT standard. Additionally or alternatively, the actual synchronization pulse of the initial sequence 270 may be checked with respect to an average or by using an infinite impulse response filter monitoring a length of the preceding synchronization pulses. This may give a better long-term check than just checking neighboring or adjacent pulses. However, this may require the receiver to receive more initial sequences 270.

Moreover, the receiver 110 may calibrate on synchronization as well as on its decision. In this scenario the receiver 110, which may for instance be part of a central control unit, may receive information concerning such an edged point by applying any kind of low-pass filtering including, for instance, a running average filter, or more complex infinite impulse response filters, finite impulse response filters, minimum or maximum trackers or the like. Moreover, it may be possible to send well-defined initialization messages after a power up to allow a calibration of the timings and to have a time basis for the later transmissions.

To allow the receiver 110 to operate with a corresponding transmitter 120 it may be advisable to specify the required safety features and protocols.

Using a receiver 110 may allow verifying the message integrity without extending the length of the check sum on each message. This may infringe the data rate requirements, especially on low data rate sensor buses and may furthermore jeopardize upwards compatibility with existing standards.

As a consequence, a receiver 110 may be used in the framework of an SPC sensor interface, which may provide an improved safety level by a corresponding timing evaluation.

FIG. 7 finally shows a flowchart of a method comprising in a process P100 receiving a pulse width encoded signal. In a process P110 a position of a transition 210 of the pulse 200 is determined by oversampling the received signal with respect to a quantization function. In a process P120 a signal indicating an unexpected event is generated, when the determined position of the transition 210 deviates from an expected position 220 according to the quantization function by more than a predetermined range 230. The quantization function maps the plurality of expected positions 220 to a plurality of values.

Figure 6:
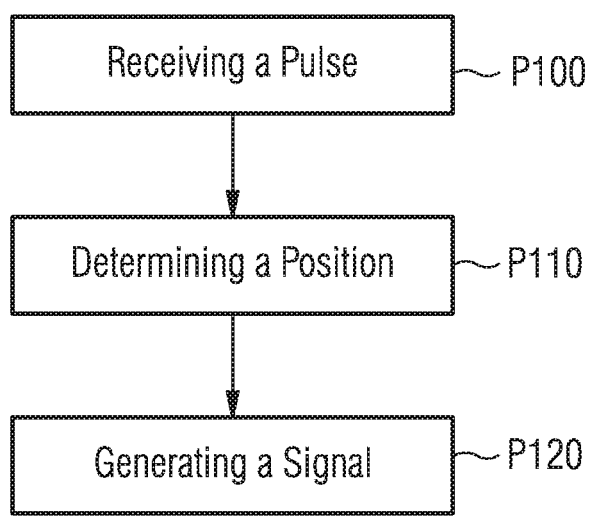
FIG. 6 shows a flowchart of the method.

Although in FIG. 6 a specific order of the processes P100, P110 and P120 is shown, the individual processes are by far not required to be executed in the order as given in FIG. 6. The order of the processes may be changed arbitrarily. Moreover, the processes may be performed timely overlapping or even simultaneously. Moreover, the processes may be executed or performed in a loop. The loop may be interrupted, when a predefined condition is fulfilled.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The methods described herein may be implemented as software, for instance, as a computer program. The sub-processes may be performed by such a program by, for instance, writing into a memory location. Similarly, reading or receiving data may be performed by reading from the same or another memory location. A memory location may be a register or another memory of an appropriate hardware. The functions of the various elements shown in the Figures, including any functional blocks labeled as "means", "means for forming", "means for determining" etc., may be provided through the use of dedicated hardware, such as "a former", "a determiner", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes, which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective processes of these methods.

Further, it is to be understood that the disclosure of multiple processes or functions disclosed in the specification or claims may not be construed as to be within the specific order. Therefore, the disclosure of multiple processes or functions will not limit these to a particular order unless such processes or functions are not interchangeable for technical reasons.

Furthermore, in some embodiments a single process may include or may be broken into multiple sub-processes. Such sub-processes may be included and part of the disclosure of this single process unless explicitly excluded.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A receiver, comprising:
   a receiver circuit to receive a pulse width encoded signal; and
   a sampling circuit to:
      determine a position of a transition of a pulse of the pulse width encoded signal by oversampling the pulse width encoded signal with respect to a quantization function,
      determine that the position of the transition deviates from an expected position, of a plurality of expected positions, according to the quantization function by more than a predetermined range,
      generate a signal, indicating an unexpected event, based on determining that the position of the transition deviates from the expected position,
      detect an error in a message corresponding to the pulse width encoded signal based on a check value identified from the pulse width encoded signal, and
      adjust, based on detecting the error and based on the signal indicating the unexpected event, a value corresponding to the position of the transition,
         the value, corresponding to the position of the transition, being adjusted to cause the error in the message to be corrected.

2. The receiver according to claim 1, wherein the check value is a 4-bit cyclic redundancy check value.

3. The receiver according to claim 1, wherein the receiver circuit is configured to:
   disregard the message based on the sampling circuit generating the signal indicating the unexpected event.

4. The receiver according to claim 1, wherein the predetermined range corresponds to less than or equal to 30% of a distance between the expected position and another expected position of the plurality of expected positions.

5. The receiver according to claim 1, wherein the predetermined range corresponds to a number of samples according to a sampling time resolution of the oversampled pulse width encoded signal.

6. The receiver according to claim 1, wherein a size of the predetermined range for the expected position is equal to a size of a predetermined range for another expected position of the plurality of expected positions.

7. The receiver according to claim 1, wherein the predetermined range is based on a fraction of the value according to the quantization function.

8. The receiver according to claim 1, wherein distances between each of the plurality of expected positions, according to the quantization function, are equal.

9. A method, comprising:
   receiving, by a receiver, a pulse width encoded signal;
   determining, by the receiver, a position of a transition of a pulse of the pulse width encoded signal by oversampling the pulse width encoded signal with respect to a quantization function;
   determining, by the receiver, that the position of the transition deviates from an expected position, of a plurality of expected positions, by more than a predetermined range;
   generating, by the receiver, a signal, indicating an unexpected event, based on determining that the position of the transition deviates from the expected position;
   detecting, by the receiver and based on a check value identified from the pulse width encoded signal, an error in a message corresponding to the pulse width encoded signal; and
   adjusting, by the receiver and based on detecting the error, a value corresponding to the position of the transition,
      the value being adjusted based on the signal indicating the unexpected event, and
      the value, corresponding to the position of the transition, being adjusted to correct the error in the message.

10. The method according to claim 9, wherein the quantization function maps the plurality of expected positions to a plurality of values that includes the value.

11. The method according to claim 10, wherein a maximum difference between any two adjacent values, of the plurality of values, is one.

12. The method according to claim 9, wherein the pulse width encoded signal includes the value encoded in a time period between a further transition and the transition, the further transition occurring before the transition.

13. The method according to claim 12, wherein the quantization function maps the position of the transition to the value, of a plurality of values, by subtracting an offset from the time period between the further transition and the transition.

14. The method according to claim 12, wherein the pulse width encoded signal includes the further transition and the transition as transitions in a common first direction.

15. The method according to claim 14, wherein the pulse width encoded signal includes an intermediate transition in an opposite second direction,
   the intermediate transition being positioned between the further transition and the transition.

16. The method according to claim 9, wherein a time resolution of the oversampled pulse width encoded signal is better than a smallest distance between expected positions of the plurality of expected positions.

17. The method according to claim 16, wherein the time resolution is better by at least a factor of four than the smallest distance between expected positions of the plurality of expected positions.

18. The method according to claim 9, further comprising:
   receiving an initial sequence representing a predetermined calibration value; and
   determining the plurality of expected positions based the initial sequence.

19. The method according to claim 18, wherein the initial sequence comprises a first transition and a second transition, and
   wherein the method further comprises:
      determining the plurality of expected positions based on a time between the first transition and the second transition of the initial sequence.

20. The method according to claim 9, wherein the receiver is configured to receive the pulse width encoded signal asynchronously.

* * * * *